United States Patent
Choi

(10) Patent No.: US 9,280,808 B2
(45) Date of Patent: Mar. 8, 2016

(54) METHOD AND APPARATUS FOR PROCESSING IMAGE

(71) Applicant: HANWHA TECHWIN CO., LTD., Changwon-si (KR)

(72) Inventor: Eun Cheol Choi, Changwon-si (KR)

(73) Assignee: Hanwha Techwin Co., Ltd., Changwon-si (KR)

(*) Notice: Subject to any disclaimer, the term of this patent is extended or adjusted under 35 U.S.C. 154(b) by 28 days.

(21) Appl. No.: 14/453,032

(22) Filed: Aug. 6, 2014

(65) Prior Publication Data

US 2015/0243003 A1   Aug. 27, 2015

(30) Foreign Application Priority Data

Feb. 27, 2014 (KR) .................... 10-2014-0023710

(51) Int. Cl.
*G06T 5/00* (2006.01)
*G06T 5/50* (2006.01)

(52) U.S. Cl.
CPC . *G06T 5/003* (2013.01); *G06T 5/50* (2013.01); *G06T 2207/10016* (2013.01); *G06T 2207/20021* (2013.01); *G06T 2207/30192* (2013.01); *G06T 2207/30232* (2013.01)

(58) Field of Classification Search
None
See application file for complete search history.

(56) References Cited

U.S. PATENT DOCUMENTS

| 2013/0071043 A1* | 3/2013 | Bai ............... G06T 5/003 382/255 |
| 2015/0071563 A1* | 3/2015 | Park ............. G06T 5/007 382/274 |
| 2015/0243003 A1* | 8/2015 | Choi ............ G06T 5/003 382/274 |

FOREIGN PATENT DOCUMENTS

| JP | 2013-058202 A | 3/2013 |
| KR | 10-2013-0127654 A | 11/2013 |
| WO | 2013/029337 A1 | 3/2013 |
| WO | 2013/172580 A1 | 11/2013 |

OTHER PUBLICATIONS

Kaiming He, Jian Sun, and Xiaoou Tang Single Image Haze Removal Using Dark Channel Prior, IEEE Transactions on Pattern Analysis and Machine Intelligence, vol. 33, No. 12, Dec. 2011.*

* cited by examiner

*Primary Examiner* — Sean Motsinger

(74) *Attorney, Agent, or Firm* — Sughrue Mion, PLLC

(57) ABSTRACT

Provided are a method and apparatus for processing an image to remove fog from the image. The apparatus for processing an image includes: a transmission estimation unit configured to calculate a transmission of an input image by synthesizing pixel-based transmissions of current pixels of the current image including a fog component, and block-based transmissions of a plurality of blocks of a previous image, each block including a plurality of pixels; an airlight estimation unit configured to calculate airlight of the input image; and an image restoration unit configured to generate, based on the transmission and the airlight, a restored image in which the fog component is removed from the current image.

20 Claims, 5 Drawing Sheets

METHOD AND APPARATUS FOR PROCESSING IMAGE

CROSS-REFERENCE TO RELATED APPLICATIONS

This application claims priority from Korean Patent Application No. 10-2014-0023710, filed on Feb. 27, 2014, in the Korean Intellectual Property Office, the disclosure of which is incorporated herein in its entirety by reference.

BACKGROUND

1. Field

Methods and apparatuses consistent with exemplary embodiments relate to processing an image, and more particularly, restoring an image in which fog is removed from an image including fog.

2. Description of the Related Art

Generally, in the case of a surveillance camera installed outdoors, weather changes, such as rain, snow, and fog, affect picture quality of an image obtained using the surveillance camera. Rain and snow have bigger particles, and appear sporadically. When images are captured, their motions change quickly. Meanwhile, fog and/or smog appear throughout a whole image, and thus degradation of picture quality is relatively uniform and consistent throughout the whole image.

SUMMARY

One or more exemplary embodiments of the inventive concept provide an image processing apparatus and method capable of improving a picture quality of images by effectively estimating and removing a fog component in moving pictures including fog.

One or more exemplary embodiments will be set forth in part in the description which follows, and the inventive concept will be apparent from the description, or may be learned by practice of the presented embodiments.

According to an aspect of an exemplary embodiment, there is provided an apparatus for processing an image which may include: a transmission estimation unit configured to calculate a transmission of an input image by synthesizing pixel-based transmissions of current pixels of the current image including a fog component, and block-based transmissions of a plurality of blocks of a previous image, each block including a plurality of pixels; an airlight estimation unit configured to calculate airlight of the input image; and an image restoration unit configured to generate, based on the transmission and the airlight, a restored image in which the fog component is removed from the current image.

The transmission estimation unit may include: a first transmission estimation unit configured to calculate the pixel-based transmissions by applying a dark channel prior to the current pixels of the current image; and a second transmission estimation unit configured to calculate the block-based transmissions by applying the dark channel prior to the each block of the previous image. The airlight may be calculated from a brightest pixel value of a brightest block among the plurality of blocks.

The second transmission estimation unit may be configured to calculate the block-based transmissions by using a lowest pixel value among the plurality of pixels in the each block of the previous image.

The apparatus may further include an interpolation unit configured to interpolate a transmission of the each block and transmissions of neighboring blocks according to a distance between a center of the each block and the current pixels.m The apparatus may further include a synthesizing unit configured to synthesize the pixel-based transmissions, to which a first weighted value is applied, and the block-based transmissions to which a second weighted value is applied and interpolation is performed.

The first transmission estimation unit and the second transmission estimation unit may be configured to calculate the pixel-based transmission and the block-based transmissions by applying the airlight of the input image.

The airlight estimation unit may include: a representative airlight value extracting unit configured to set a pixel value of a brightest pixel in the each block of the previous image or an average of the pixel value of the brightest pixel and pixel values of pixels to the left and right of the brightest pixel as a representative airlight value of the block, extract a brightest representative airlight value among the representative airlight values of the plurality of blocks as airlight of the previous image, and calculate the airlight of the input image using the airlight of the previous image; and a filter which removes noise of the airlight of the input image.

The transmission estimation unit may be configured to apply the airlight of the input image to obtain the pixel-based transmissions and the block-based transmissions.

The filter may include an infinite impulse response (IIR) filter.

The first transmission unit and the second transmission unit may be configured to calculate the pixel-based transmission and the block-based transmissions by applying the airlight of the input image.

According to an aspect of another exemplary embodiment, there is provided a method of processing an image which may include: calculating a transmission of an input image by synthesizing pixel-based transmissions of current pixels of the current image including a fog component, and block-based transmissions of a plurality of blocks of a previous image, each block comprising a plurality of pixels; calculating airlight of the input image; and restoring an image in which, based on the transmission and the airlight, a fog component is removed from the input image.

The pixel-based transmissions may be calculated by applying a dark channel prior to the current pixels of the current image, and the block-based transmissions may be calculated by applying the dark channel prior to the each block of the previous image. The airlight may be calculated from a brightest pixel value of a brightest block among the plurality of blocks.

The block-based transmissions may be calculated by using a lowest pixel value among the plurality of pixels in the each block of the previous image.

The calculating the block-based transmissions may include: dividing the previous image into the plurality of blocks; extracting the lowest pixel value as a representative pixel value of the each block, by comparing pixel values of the plurality of pixels in the each block; and calculating the block-based transmissions by using the representative pixel value.

The pixel-based transmission and the block-based transmissions may be calculated by applying the airlight of the input image.

The method may further include interpolating a transmission of the each block and transmissions of neighboring blocks according to a distance between a center of the each block and the current pixels.

The method may further include synthesizing, the pixel-based transmissions, to which a first weighted value is applied, and the block-based transmissions, to which a second weighted value is applied and interpolation is performed, may be synthesized.

The estimating the airlight may include: setting a pixel value of a brightest pixel in the each block of the previous image or an average of the pixel value of the brightest pixel and pixel values of pixels to the left and right of the brightest pixel as a representative airlight value of the block, extracting a brightest representative airlight value among the representative airlight values of the plurality of blocks as the airlight of the previous image; calculating the airlight of the input image using the airlight of the previous image; and removing noise from the airlight of the input image.

The noise may be removed by applying an infinite impulse response (IIR) filter.

According to an aspect of still another exemplary embodiment, there is provided a computer readable recording medium having recorded thereon a program for executing the above method of processing an image.

According to the exemplary embodiments of the inventive concept, fog components can be effectively estimated and removed from moving pictures including fog, and thus a picture quality of images is improved.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
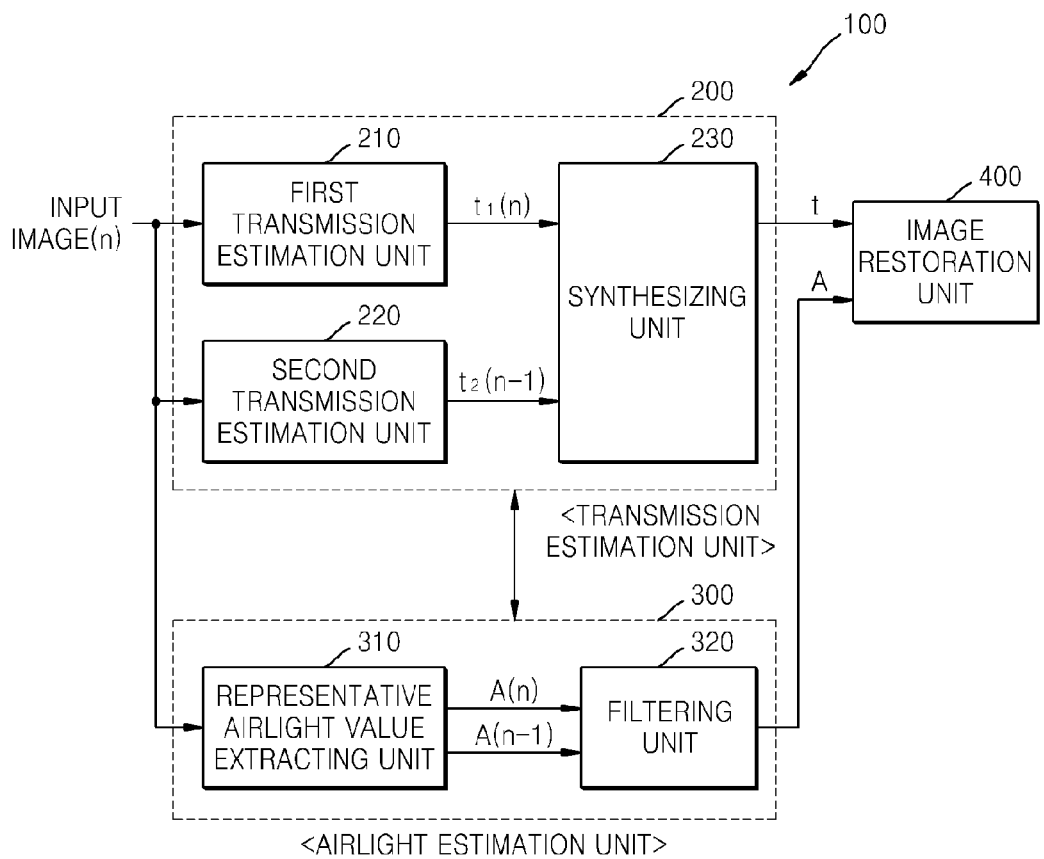
FIG. 1 is a block diagram showing the structure of an apparatus for processing an image according to an exemplary embodiment.

The inventive concept will now be described more fully with reference to the accompanying drawings, in which exemplary embodiments are shown. The inventive concept may, however, be embodied in many different forms and should not be construed as being limited to the embodiments set forth herein; rather, these embodiments are provided so that this disclosure will be thorough and complete, and will fully convey the inventive concept to those of ordinary skill in the art. In the description of the embodiments, if it is determined that a detailed description of commonly-used technologies or structures related to the inventive concept may unnecessarily obscure the subject matter of the invention, the detailed description will be omitted.

The terms used in the present specification are merely used to describe particular exemplary embodiments, and are not intended to limit the inventive concept. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. While such terms as "first," "second," etc., may be used to describe various components, such components must not be limited to the above terms. The above terms are used only to distinguish one component from another.

The exemplary embodiments of the inventive concept will be described below in more detail with reference to the accompanying drawings. Those components that are the same or are in correspondence are rendered the same reference numeral regardless of the figure number, and redundant explanations are omitted. As used herein, the term "and/or" includes any and all combinations of one or more of the associated listed items.

In the image processing and/or computer vision fields, a mathematical model such as following equation 1 is widely used in order to express an image including fog:

$$I(x)=J(x)t(x)+A(1-t(x)) \qquad (1)$$

In the above equation, $I(x)$ denotes an input image including fog, $J(x)$ denotes a scene radiance indicating a state in which fog is removed, that is, an image in which fog is removed, and A denotes airlight meaning a fog value of an input image, and $t(x)$ denotes a transmission which means a ratio of a radiation quantity of an object actually transmitted to human eyes by air scattering. Accordingly, if $t(x)$ is close to 1, brightness of an object is transmitted intact to human eyes without being scattered by fog and other factors. The closer, $t(x)$ is to 0, the more loss of information by a thick fog and other factors occurs and the object becomes not clear to human eyes.

The model as equation 1 is expressed in each of R, G, and B color channels of an image. In order to remove fog from an input image, airlight A and transmission $t(x)$ are calculated from the input image $I(x)$ including fog, and by using A and $t(x)$, $J(x)$ is finally restored.

An apparatus for removing fog from an image according to an exemplary embodiment uses a dark channel prior in order to remove fog from an input image by using the model of equation 1.

The dark channel prior is a method which is suggested in order to remove fog from an image. With respect to each pixel of a clear image having no fog, some pixels in a patch having a predetermined size and centered around each pixel have at least one color channel having a very small value close to 0. This can be expressed as following equation 2:

$$J_{dark}(x) = \min_{c \in \{r,g,b\}} \left( \min_{y \in \Omega(x)} (J^c(y)) \right) \qquad (2)$$

Here, $J_{dark}(X)$ denotes the dark channel prior about a pixel x of an image J, c denotes a R, G, and B color channel value, and $\Omega(x)$ denotes a patch centered around the pixel x.

That is, the dark channel prior means brightness of the darkest channel in the current patch. There is a tendency that when fog exists, a dark channel prior value is high, and when fog does not exist, the dark channel prior value is low.

That is, when fog does not exist, the dark channel prior value has a tendency to converge on 0. Accordingly, an operator min is applied to both sides of equation 1, and if both sides are divided by A, following equation 3 is obtained:

$$\min_c\left(\min_{y\in\Omega(x)}\left(\frac{J^c(y)}{A^c}\right)\right) = \tilde{t}(x)\min_c\left(\min_{y\in\Omega(x)}\left(\frac{J^c(y)}{A^c}\right)\right) + (1-\tilde{t}(x)) \quad (3)$$

As the product including J converges on 0 on the right-hand side of equation 3, the transmission is accordingly obtained by following equation 4:

$$\tilde{t}(x) = 1 - \min_c\left(\min_{y\in\Omega(x)}\left(\frac{J^c(y)}{A^c}\right)\right) \quad (4)$$

The transmission ($\tilde{t}(x)$) calculated in equation 4 is based on the patch $\Omega(x)$ having a predetermined size and does not match the input image completely, and on a block phenomenon in which edges of the dark channel prior and the image do not match perfectly. Accordingly, in order to remove this block phenomenon, through a process for refining the calculated transmission by a numerical analytic method such as a softmatting algorithm, a final transmission (t(x)) is calculated.

The image J(x) from which fog is removed by using the calculated final transmission (t(x)) is obtained by following equation 5:

$$J(x) = \frac{I(x) - A}{\max(t(x), t_0)} + A \quad (5)$$

Here, $t_0$ is an upper limit value set as a restriction for the transmission, and the value may be set by a user.

The removal of fog depends on how accurately the transmission (t(x)) is estimated. The final transmission (t(x)) is calculated through a process for refining the transmission ($\tilde{t}(x)$) calculated as described above, by a numerical analytic method such as a softmatting algorithm. However, there is a drawback in that a large amount of line memories and hardware resources are required when the final transmission (t(x)) is calculated using the softmatting algorithm. Accordingly, in an exemplary embodiment of the present inventive concept, the refining process using the softmatting algorithm is omitted, and by using equation 4, a pixel-based transmission (a first transmission, $t_1(n)$, $t_{PTX}$) from an input image and a block-based transmission (a second transmission, $t_2(n-1)$, $t_{BTX}$) are calculated. Then, the pixel-based transmission and the block-based transmission are synthesized and the result is calculated as the final transmission t(x), and thus use of line memories and hardware resources is reduced and real-time processing is enabled. Also, when airlight is estimated, a previous image (n−1) block used in the calculation of the block-based transmission is used, and thus the amount of calculation is reduced.

FIG. 1 is a block diagram showing a structure of an apparatus for processing an image 100 according to an exemplary embodiment.

Referring to FIG. 1, the apparatus 100 includes a transmission estimation unit 200, an airlight estimation unit 300 and an image restoration unit 400.

The transmission estimation unit 200 synthesizes pixel-based transmissions which are calculated by applying a dark channel prior to current pixels of an input image including fog, and block-based transmissions which are calculated by applying a dark channel prior to each block of a previous image divided into a plurality of blocks, thereby estimating a final transmission.

The transmission estimation unit 200 includes a first transmission estimation unit 210, a second transmission estimation unit 220 and a synthesizing unit 230.

The first transmission estimation unit 210 calculates a pixel-based transmission ($t_{PTX}$) to which the dark channel prior is applied, by using the pixel value (R/G/B values) of a current pixel included in an input image (n) and the airlight. The patch size ($\Omega(x)$) is 1 in equation 4 and the first transmission estimation unit 210 obtains the transmission ($t_{PTX}$) by following equation 6:

$$t_{PTX} = 1 - \min_c\left(\frac{J^c(y)}{A^c}\right) \quad (6)$$

As shown in equation 6, the first transmission can be calculated only if there are the pixel value of a current pixel position and the airlight which will be explained later, and therefore a separate line memory is not required.

Figure 4A:
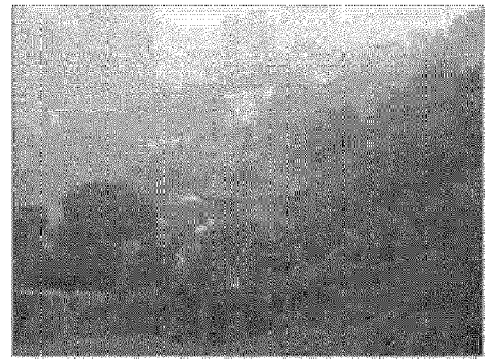
FIGS. 4A-4E show fog images and images from which fog is removed according to an exemplary embodiment.
Figure 4B:

However, when fog is removed by using only the first transmission, the darkest channel value of the current pixel is made to be 0. Accordingly, although chroma is maximized, local contrast breaks down. FIG. 4A is an example of an input image and FIG. 4B shows a result image in which fog is removed from the input image of FIG. 4A. Referring to FIG. 4B, it is shown that the chroma is maximized but the local contrast breaks down.

In order to solve the local contrast break-down, the present embodiment estimates a second transmission as a block-based transmission. The second transmission estimation unit 220 calculates a block-based transmission by using the lowest pixel value in each block of the previous image (n−1) and the airlight.

Figure 2:
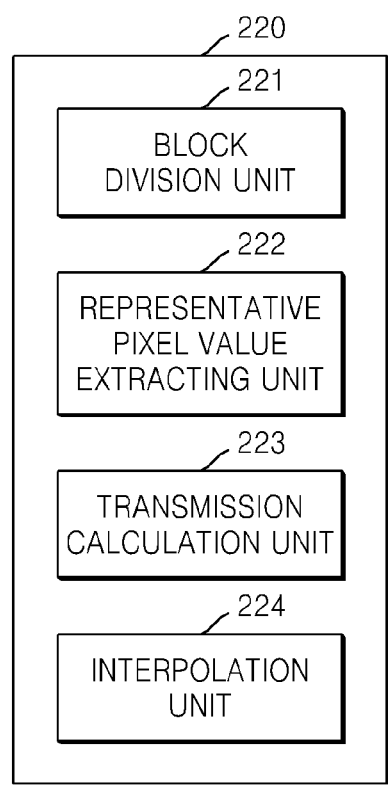
FIG. 2 is a detailed block diagram of a second transmission estimation unit according to an exemplary embodiment.

FIG. 2 is a detailed block diagram of the second transmission estimation unit 220 which includes a block division unit 221, a representative pixel value extracting unit 222, a transmission calculation unit 223 and an interpolation unit 224.

Figure 3:
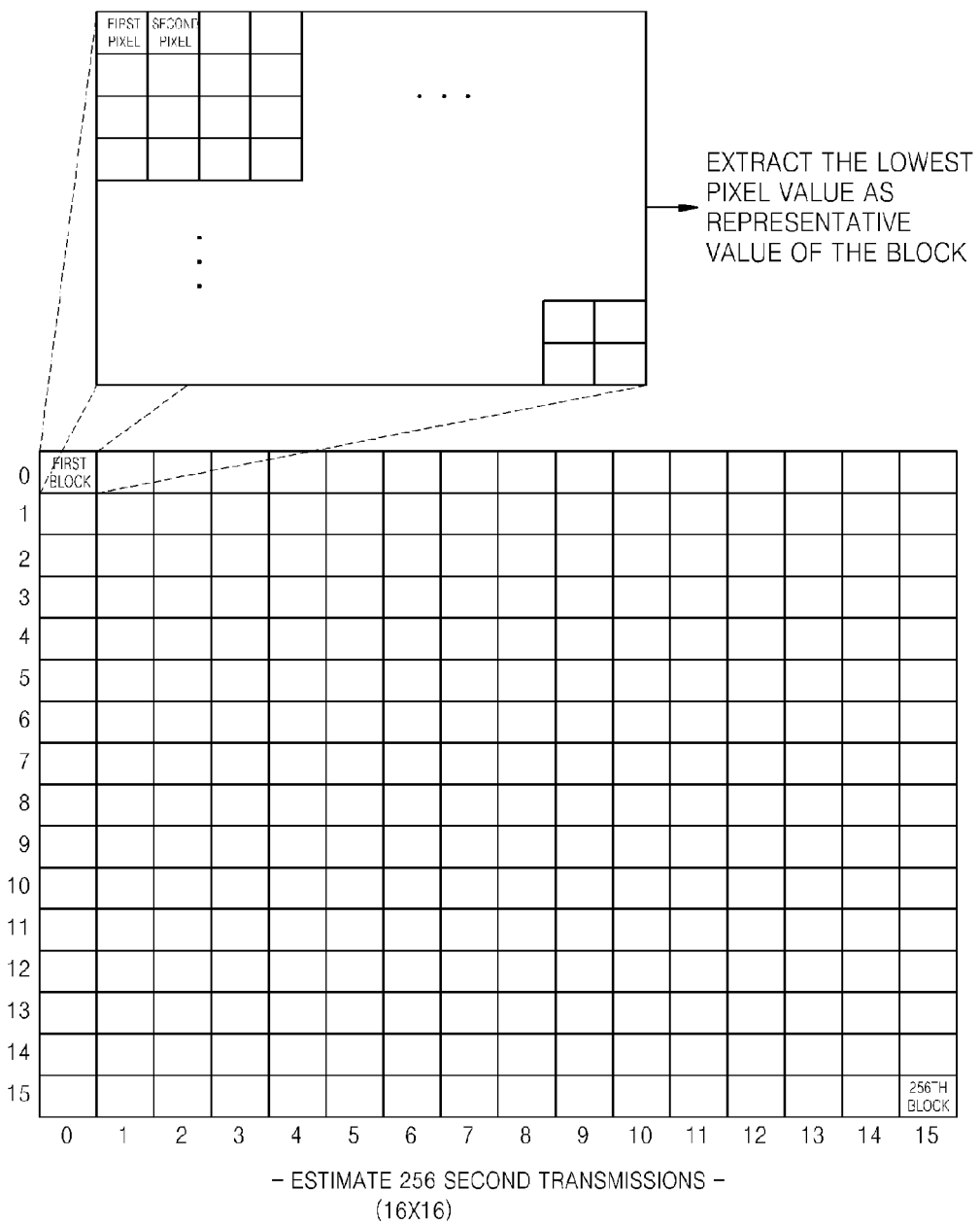
FIG. 3 is a diagram illustrating calculation of a block-based transmission in a second transmission estimation unit according to an exemplary embodiment.

The block division unit 221 divides a previous image (n−1) into a plurality of blocks (M×N blocks). FIG. 3 shows an example of block division in which the previous image (n−1) is divided into 16×16 blocks. For example, with the previous image (n−1) having a resolution of 1024×768, the block division unit 221 can divide the image into 256 blocks each having 64×48 pixels. Here, the number of divided blocks may be changed by setting.

The representative pixel value extracting unit 222 extracts a pixel having a lowest pixel value as a representative pixel of each block, by comparing pixel values of pixels included in the block, and extracts a lowest pixel value among the pixel values of the representative pixels of respective blocks as the representative pixel value. Referring to FIG. 3, pixel values of a first pixel and a second pixel included in a first block are compared to each other and only the lower pixel value is stored, and the stored pixel and a pixel value of a third pixel is compared and the lower pixel value is stored. In this manner, pixel values of the 64×48 pixels are compared and the lowest pixel value is extracted as the representative pixel value of the first block. From FIG. 3, 256 representative pixel values can be extracted.

According to technologies of the related art, when a transmission is estimated, a patch at the center of which a current pixel is positioned is used, and for every current pixel, all the pixels in the patch area should be compared, and thus, a very large amount of repetitive calculations are required. However, according to the extraction of representative pixel values as described above, the amount of calculations can be sharply reduced without repetitive calculations.

The transmission calculation unit 223 calculates a block-based transmission ($t_{BTX}$) to which the dark channel prior is applied, by using the representative pixel value of each block and the airlight. The block-based transmission ($t_{BTX}$) is obtained by following equation 7, and the same number of transmissions as the number of blocks (256 in the case of FIG. 3) are obtained:

$$t_{BTX} = 1 - \min_c \left( \min_{y \in B(x)} \left( \frac{J^c(y)}{A^c} \right) \right) \quad (7)$$

Figure 4C:

FIG. 4C shows a result image in which fog is removed from an input image shown in FIG. 4A. Referring to FIG. 4C, an example is shown of an image in which a blocking artifact occurs because transmission is obtained for each block and applied to the input image of FIG. 4A.

The interpolation unit 224 is for preventing the blocking artifact.

Figure 4D:
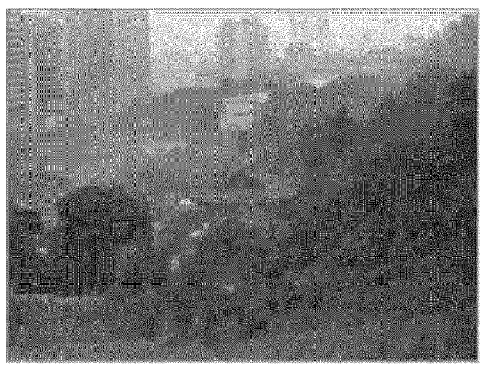

The interpolation unit 224 calculates a distance between the center of each block and a current pixel, and obtains a weighted average of the transmission of each block and the transmissions of neighboring blocks, by applying weight values in inverse proportion to the distance. Thus, the interpolation unit 224 performs interpolation to use the weighted average as the transmission of a current pixel. FIG. 4D shows an example of an image in which a blocking artifact is removed by interpolation processing of the image shown in FIG. 4C in which the blocking artifact occurs.

In FIG. 4D, although the blocking artifact is removed, the transmission is not an optimum transmission corresponding to the block, and the fog removing capability appears lower than that of FIG. 4C. As shown, on the roof of a Korean-style house, a halo effect is apparent.

Accordingly, in the present embodiment, a final transmission is obtained by synthesizing the first transmission as a pixel-based transmission which has an advantage in terms of chroma and the second transmission as a block-based transmission which has an advantage in terms of the amount of calculations and/or local contrast.

For obtaining the final transmission, the synthesizing unit 230 calculates a final transmission to be applied to the current pixel, by synthesizing the first transmission and the second transmission of a block corresponding to the current pixel. A final transmission is obtained by following equation 8:

$$Trx = w \times t_{PTX} + (1-w) \times Int(t_{BTX}) \quad (8)$$

Figure 4E:

Here, Trx denotes a final transmission (t in FIG. 1, t(x) in equation 5), w denotes a weight value, $t_{PTX}$ denotes a first transmission (t1(n)), Int( ) denotes an interpolation function, $t_{BTX}$ denotes a second transmission (t2(n−1)). Here, the weight value may be defined as a constant according to a purpose, and may be adaptively applied to a random area according to a statistical characteristic of an image. FIG. 4E shows an example of an image from which fog is removed by applying a final transmission.

In the present embodiment, the second transmission estimation unit 220 calculates a second transmission from the previous image (n−1) and applies the second transmission to an input image (n), that is, the current image. Referring to FIG. 1, the second transmission estimation unit 220 calculates a second transmission from an input image (n), stores the second transmission, and then applies to the second transmission of the next image (n+1).

The airlight estimation unit 300 receives block division information from the second transmission estimation unit 220, and divides the previous image (n−1) into the same number of blocks as the number of blocks used in estimating the second transmission. The airlight estimation unit 300 calculates a brightest pixel value included in a brightest block as the airlight.

Here, considering the amount of calculations, it may be designed such that in calculating the airlight, the airlight can be obtained together when the second transmission is obtained. According to this design, the amount of calculations for obtaining the airlight may be reduced.

In order to obtain the airlight, assumptions, "As fog is light in an atmosphere arriving from the sun, the fog has very bright value in an image," and "Pixel values affected by fog is similar to the airlight," are used. Then, referring to equation 1, the bigger the transmission is, the more the fog affects the image. Accordingly, if the two assumptions are combined, it can be understood that the airlight has a very bright value in an image and the airlight can be obtained in an area which is most affected by the fog. Generally, a brightest pixel value is sometimes selected as the airlight, and in this case, a white object may be selected and cause a problem. Accordingly, when the airlight is estimated based on blocks, the probability that an error will occur decreases.

The airlight estimation unit 300 may include a representative airlight value extracting unit 310 and a filtering unit 320.

The representative airlight value extracting unit 310 sets a bright pixel value as the representative airlight value of each block, by comparing pixel values of pixels included in each block of the previous image (n−1), and extracts a brightest representative airlight value among all the representative airlight values of the previous image (n−1), as the airlight. Here, when the representative airlight value is extracted, in order to prevent an error due to noise, an average of the pixel value of the brightest pixel and pixel values of pixels to the left and to the right of the brightest pixel may be obtained and set as the representative airlight value of each block. When the airlight is estimated by this method, distortion due to noise can be prevented, and use of line memories (not shown) can be avoided because only pixels to the left and to the right are used.

The filtering unit 320 removes noise from the airlight. When the airlight is estimated and applied in each image frame, flickering by a change in the airlight may occur. Accordingly, through infinite impulse response (IIR) filtering, the airlight to be actually applied is determined. The airlight is obtained by following equation 9:

$$A = a \times A_n + (1-a) A_{n-1} \quad (9)$$

Here, A denotes a final airlight, $A_n$ denotes airlight of an input image (n), $A_{n-1}$ denotes airlight of a previous image (n−1), and a denotes a rate of applying the airlight obtained in the input image (n). The smaller the value of a is, the less flickering occurs, and the bigger the value of a is, the higher the probability that flickering will occur.

In the present embodiment, the airlight estimation unit 300 estimates a final airlight (A) with a sum of the airlight ($A_n$) estimated from the input image (n) and the airlight ($A_{n-1}$) estimated from the previous image (n−1). The airlight estimation unit 300 stores the airlight estimated in the input image (n) and applies it to estimation of the airlight in the next image (n+1).

The image restoration unit 400 generates a restored image from which fog is removed, by applying the final transmission (Trs, t(x)) calculated in the transmission estimation unit 200 and the airlight (A) calculated in the airlight estimation unit 300 to equation 5.

Thus, by removing a fog component from moving pictures including the fog through effective estimation, the picture quality of images improves.

Figure 5:
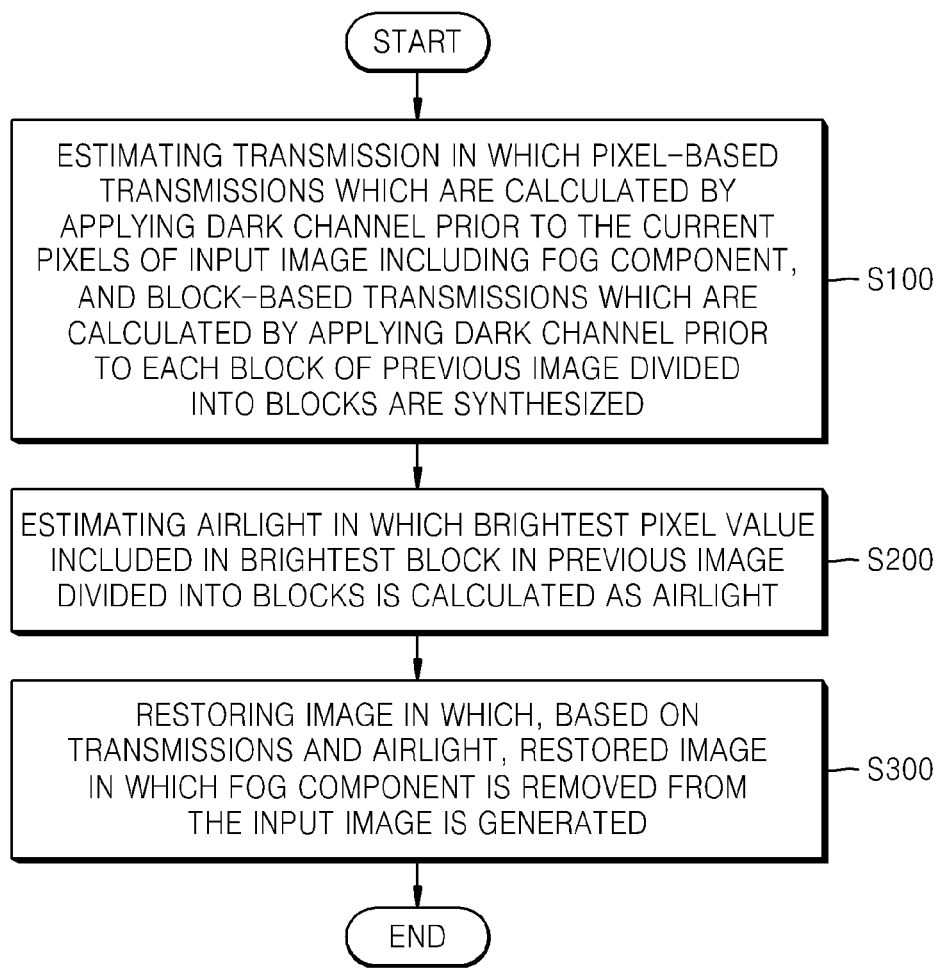
FIG. 5 is a flowchart of operations of a method of processing an image according to an exemplary embodiment.

Referring to FIG. 5, a method of processing an image according to an exemplary embodiment will now be explained. The method of processing an image according to the embodiment may be performed in the apparatus for processing an image 100 and by using elements surrounding the apparatus 100. In describing the method, explanations overlapping with those of FIGS. 1 through 4 will be omitted.

Referring to FIG. 5, the apparatus for processing an image 100 estimates a final transmission (t(x)), by synthesizing pixel-based transmissions (the first transmission, $t_1(n)$, $t_{PTX}$) which are calculated by applying a dark channel prior to the current pixels of an input image (n) including a fog component, and block-based transmissions (the second transmission, $t_2(n-1)$, $t_{BTX}$) which are calculated by applying a dark channel prior to each block of a previous image (n−1) divided into a plurality of blocks in operation S100. Here, the pixel-based transmission may be expressed as the first transmission and the block-based transmission may be expressed as the second transmission. Using equation 6, the apparatus for processing an image 100 calculates the pixel-based transmission ($t_{PTX}$) to which the dark channel prior is applied, by using the pixel values (R/G/B values) of the current pixel and the airlight, thereby estimating the first transmission. To estimate the second transmission, the apparatus for processing an image 100 divides the previous image into a plurality of blocks, extracts a pixel having a lowest pixel value as the representative pixel, by comparing pixel values of pixels included in each block, and extracts a lowest pixel value among pixel values of the representative pixels of the blocks, as the representative pixel value. The apparatus for processing an image 100 calculates the block-based transmission ($t_{BTX}$) by using the extracted representative pixel value and the airlight based on equation 7. Here, in order to remove a blocking artifact, the second transmission is interpolated. Also, the second transmission is calculated from the previous image (n−1) and applied to the input image (n), that is, the current image. The second transmission calculated from the input image (n) is applied to the next image. The apparatus for processing an image 100 synthesizes the first transmission to which the first weight value is applied and the second transmission which is interpolated after the second weight value is applied, and calculates the final transmission to be applied to the current pixel.

The apparatus for processing an image 100 divides the previous image (n−1) into the same number of blocks as the number of blocks used in estimating the second transmission, and calculates a brightest pixel value included in a brightest block as the airlight in operation S200.

The apparatus for processing an image 100 sets a brightest pixel value as the representative airlight value of each block, by comparing pixel values of pixels included in each block, and extracts the brightest representative airlight value among all the representative airlight values of the previous image, as the airlight of the previous image. Here, when the representative airlight value is extracted, in order to prevent an error due to noise, an average of the pixel value of the brightest pixel and pixel values of pixels to the left and to the right of the brightest pixel may be obtained and set as the representative airlight value of each block. Also, when the airlight is estimated and applied in each image frame, flickering due to a change in the airlight may occur. Accordingly, through infinite impulse response (IIR) filtering, noise is removed and the airlight to be actually applied is determined. Here, a final airlight (A) is estimated with the sum of the airlight ($A_n$) estimated from the input image (n) and the airlight ($A_{n-1}$) estimated from the previous image (n−1). The airlight estimated in the input image (n) is stored and applied to estimation of the airlight in the next image (n+1). Thus, if the estimation of the final transmission (Trs, t(x)) and the airlight (A) is completed, the apparatus for processing an image 100 generates a restored image from which fog is removed, by applying the final transmission (Trs, t(x)) and the airlight (A) to equation 5.

A plurality of units represented by a block as illustrated in FIGS. 1 and 2 may be embodied as the various numbers of hardware, software and/or firmware structures that execute respective functions described above, according to exemplary embodiments. For example, these units may use a direct circuit structure, such as a memory, processing, logic, a look-up table, etc. that may execute the respective functions through controls of one or more microprocessors or other control apparatuses. These units may be specifically embodied by a module, a program, or a part of code, which contains one or more executable instructions for performing specified logic functions. Also, at least one of the above units may further include a processor such as a central processing unit (CPU) that performs the respective functions, a microprocessor, or the like.

The use of the terms "a" and "an" and "the" and similar referents in the context of describing the above embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein.

The steps of all methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the inventive concept unless otherwise claimed. Numerous modifications and adaptations will be readily apparent to those of ordinary skill in the art without departing from the spirit and scope of the inventive concept.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the inventive concept have been described with reference to the figures, it will be understood by those of ordinary skill in the art that various changes in form and details may be made therein without departing from the spirit and scope of the inventive concept as defined by the following claims.

What is claimed is:

1. An apparatus for processing an image, the apparatus comprising:
   a transmission estimation unit configured to calculate a transmission of an input image by synthesizing pixel-based transmissions of current pixels of the current image including a fog component, and block-based transmissions of a plurality of blocks of a previous image, each block comprising a plurality of pixels;
an airlight estimation unit configured to calculate airlight of the input image; and
an image restoration unit configured to generate, based on the transmission and the airlight, a restored image in which the fog component is removed from the current image.

2. The apparatus of claim 1, wherein the transmission estimation unit comprises:
a first transmission estimation unit configured to calculate the pixel-based transmissions by applying a dark channel prior to the current pixels of the current image; and
a second transmission estimation unit configured to calculate the block-based transmissions by applying the dark channel prior to the each block of the previous image, and
wherein the airlight is calculated from a brightest pixel value of a brightest block among the plurality of blocks.

3. The apparatus of claim 2, wherein the second transmission estimation unit is configured to calculate the block-based transmissions by using a lowest pixel value among the plurality of pixels in the each block of the previous image.

4. The apparatus of claim 3, wherein the second transmission estimation unit comprises:
a block division unit configured to divide the previous image into the plurality of blocks;
a representative pixel value extracting unit configured to extract the lowest pixel value as a representative pixel value of the each block, by comparing pixel values of the plurality of pixels in the each block; and
a transmission calculation unit configured to calculate the block-based transmissions by using the representative pixel value.

5. The apparatus of claim 4, wherein the first transmission estimation unit and the second transmission estimation unit are configured to calculate the pixel-based transmission and the block-based transmissions by applying the airlight of the input image.

6. The apparatus of claim 4, further comprising an interpolation unit configured to interpolate a transmission of the each block and transmissions of neighboring blocks according to a distance between a center of the each block and the current pixels.

7. The apparatus of claim 1, further comprising a synthesizing unit is configured to synthesize the pixel-based transmissions, to which a first weighted value is applied, and the block-based transmissions to which a second weighted value is applied and interpolation is performed.

8. The apparatus of claim 1, wherein the airlight estimation unit comprises:
a representative airlight value extracting unit configured to set a pixel value of a brightest pixel in the each block of the previous image or an average of the pixel value of the brightest pixel and pixel values of pixels to the left and right of the brightest pixel as a representative airlight value of the block, extract a brightest representative airlight value among the representative airlight values of the plurality of blocks as airlight of the previous image, and calculate the airlight of the input image using the airlight of the previous image; and
a filter which removes noise from the airlight of the input image.

9. The apparatus of claim 7, wherein the filter includes an infinite impulse response (IIR) filter to remove the noise from the airlight of the input image.

10. The apparatus of claim 1, wherein the airlight estimation unit calculates the airlight of the input image and applies the airlight of the input image to calculation of airlight of a next image.

11. A method of processing an image, the method comprising:
calculating a transmission of an input image by synthesizing pixel-based transmissions of current pixels of the current image including a fog component, and block-based transmissions of a plurality of blocks of a previous image, each block comprising a plurality of pixels;
calculating airlight of the input image; and
restoring an image in which, based on the transmission and the airlight, a fog component is removed from the input image.

12. The method of claim 11, wherein the pixel-based transmissions are calculated by applying a dark channel prior to the current pixels of the current image, and the block-based transmissions are calculated by applying the dark channel prior to the each block of the previous image, and
wherein the airlight is calculated from a brightest pixel value of a brightest block among the plurality of blocks.

13. The method of claim 12, wherein the block-based transmissions are calculated by using a lowest pixel value among the plurality of pixels in the each block of the previous image.

14. The method of claim 13, wherein the calculating the block-based transmissions comprises:
dividing the previous image into the plurality of blocks;
extracting the lowest pixel value as a representative pixel value of the each block, by comparing pixel values of the plurality of pixels in the each block; and
calculating the block-based transmissions by using the representative pixel value.

15. The method of claim 14, the pixel-based transmission and the block-based transmissions are calculated by applying the airlight of the input image.

16. The method of claim 14 further comprising interpolating a transmission of the each block and transmissions of neighboring blocks according to a distance between a center of the each block and the current pixels.

17. The method of claim 12, wherein, further comprising synthesizing, the pixel-based transmissions, to which a first weighted value is applied, and the block-based transmissions, to which a second weighted value is applied and interpolation is performed, are synthesized.

18. The method of claim 11, wherein the estimating the airlight comprises:
setting a pixel value of a brightest pixel in the each block of the previous image or an average of the pixel value of the brightest pixel and pixel values of pixels to the left and right of the brightest pixel as a representative airlight value of the block, extracting a brightest representative airlight value among the representative airlight values of the plurality of blocks as the airlight of the previous image;
calculating the airlight of the input image using the airlight of the previous image; and
removing noise from the airlight of the input image.

19. The method of claim 11, wherein the airlight of the input image is applied to calculation of airlight of a next image.

20. A non-transitory computer readable recording medium having recorded thereon a program for executing the method of claim 11.

* * * * *